E. EVANS & H. ZIEMENDORFF.
ELECTRIC METER.
APPLICATION FILED NOV. 12, 1912.

1,163,226.

Patented Dec. 7, 1915.

UNITED STATES PATENT OFFICE.

EVAN EVANS AND HEINRICH ZIEMENDORFF, OF BERLIN, GERMANY, ASSIGNORS TO GENERAL ELECTRIC COMPANY, A CORPORATION OF NEW YORK.

ELECTRIC METER.

1,163,226.  Specification of Letters Patent.  Patented Dec. 7, 1915.

Application filed November 12, 1912. Serial No. 730,948.

*To all whom it may concern:*

Be it known that we, EVAN EVANS and HEINRICH ZIEMENDORFF, subjects of the Emperor of Germany, residing at Berlin, Germany, have invented new and useful Improvements in Electric Meters, of which the following is a specification.

Our invention relates to meters, and particularly to electric meters for determining the amount of energy consumed in an electrical installation in excess of a specified quantity during the times that the rate of consumption of energy exceeds a significant predetermined value.

The objects of our invention are to generally improve the construction and operation of meters of this type.

Broadly our invention consists in providing a meter which is adapted to register the quantity of energy consumed only when the rate of consumption of energy is in excess of a predetermined rate and in conjunction therewith a clock-work mechanism for registering the length of time that the rate of consumption exceeds the predetermined rate.

Our invention further consists in providing a novel construction of meter which is adapted to operate only when the rate of consumption of energy exceeds a predetermined rate and to directly record only the energy consumed in excess of a specified quantity during the times that the rate of consumption exceeds the predetermined rate.

The novel features which we believe to be characteristic of our invention will be definitely indicated in the claims appended hereto. The features of construction and method of operation will be understood by reference to the following description taken in connection with the accompanying drawings which show the preferred embodiments of our invention and in which:—

Figure 1:
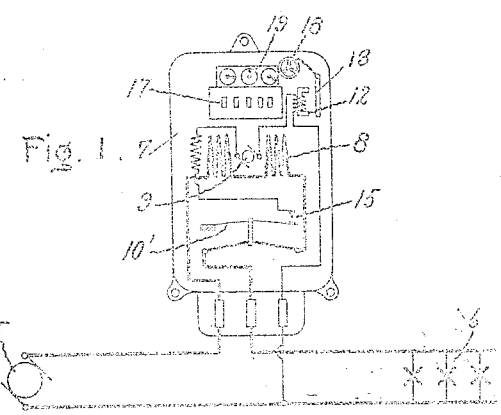
Figure 2:
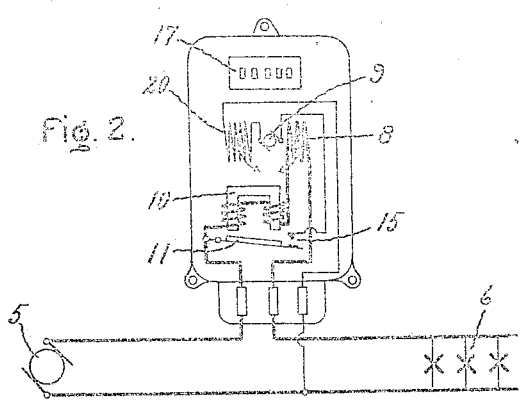

Figure 1 is a diagrammatic view of a meter involving the novel features of our invention; and Fig. 2 is a diagrammatic view of another improved meter embodying certain novel features of our invention.

Referring first to Fig. 1 of the drawings, there is diagrammatically illustrated a generator 5 supplying electric energy to an electrical installation comprising translating devices 6. An electric meter 7 is operatively associated with the translating devices 6. This meter, as illustrated in the drawings, is provided with current coils 8 in series with the devices 6, and a rotatable armature 9 carrying the usual potential coil and adapted to be connected across the line conductors of the installation. In the type of meter shown in the drawings the potential coil is carried by the armature 9, but it will be understood that this type of meter is shown merely for the purpose of illustration and that the potential coil may, if desired, be stationary, our invention being applicable to any of the well known types of electric meters. A current responsive device 10' of the well known hot wire type is included in series with the current coils 8. It will of course be understood that we have shown this type of current responsive device only by way of example, since any of the well known forms of current responsive devices may be employed.

An electromagnet 12, having a coöperating armature 13, and a contact circuit-closer 15 are included in series relation in the circuit of the potential coil of armature 9 of the meter. It will be evident that the electromagnet 12 and circuit-closer 15 may be operatively related to the potential coil in other ways, the essential requirement, so far as our present invention is concerned, being that the electromagnet 12 be energized and the potential coil electrically connected across the line conductors of the translating devices 6 when the contacts 15 are closed. The closing of the contacts 15 is effected by the expansion of the current responsive element of the device 10', as will be more fully described hereinafter.

The meter is provided with a register 17 operatively connected to the rotatable member in the well known manner. The meter is further provided with a time-meter or clockwork mechanism having an escapement 18 and a register 19. The armature 13 is provided with a detent which normally holds the escapement locked but which releases the escapement when the magnet 12 is energized.

The operation of the apparatus is as follows: The current responsive device 10' is so designed that it will operate to close the contacts 15 when a predetermined current flows in the translating devices 6 of the installation. In other words, when the rate of consumption of energy in the translating devices exceeds a predetermined value the contacts 15 are closed by the expansion of the hot wire element of the current responsive device 10'. While the rate of consumption of energy is below the predetermined value, the contacts 15 are maintained open, and hence the circuit including the potential coil carried by the meter armature 9 and the electromagnet 12 is open. When the rate of consumption of energy exceeds this predetermined value the contacts 15 are closed by the current responsive device 10', thereby completing the circuit of the potential coil and energizing the relay 12. The escapement 18 of the clockwork mechanism is thereby released and the register 19 will register the length of time that the rate of consumption of energy is in excess of the predetermined value, while the register 17 will register the total quantity of energy consumed during this time.

The register dial 17 of the meter shown in Fig. 1 will register the total amount of energy consumed in the translating devices when the rate of consumption is in excess of the predetermined rate. The meter of our present invention is particularly adapted to be used where it is desired to know only the quantity of energy consumed in excess of a predetermined contract quantity, which contract quantity is the quantity of energy consumed when the rate of consumption is below a predetermined rate. To this end the reading of the time register 19 must be multiplied by the predetermined rate and this product subtracted from the reading of the register dial 17. If the predetermined rate is a constant the time register 19 may obviously be standardized to read directly in watt hours in which case the reading of the dial 19 has only to be subtracted from the reading of the dial 17 in order to obtain the quantity of energy consumed in excess of the contract quantity.

The meter shown in Fig. 2 is adapted to directly register only the energy consumed in excess of a predetermined contract quantity. The consumer can use as much energy as he desires as long as his rate of consumption is below a predetermined rate. When he exceeds this predetermined rate of consumption, however, the meter will not register the total energy being consumed, but only that being consumed in excess of the contract quantity. In this meter the clock mechanism is dispensed with and the meter armature, carrying the potential coil, is continuously connected with the register dial 17, but is only adapted to operate when the rate of consumption of energy exceeds a predetermined rate which is determined by the current responsive device 10. This current responsive device is adapted to close by its armature 11 and the contacts 15, the electric circuit of the potential coil carried by the armature 9 of the meter.

A very important feature of the meter shown in Fig. 2 consists in the auxiliary coil 20 which is in series with the meter armature and is hence only energized when the contacts 15 are closed. This coil 20 is wound, as indicated by the arrows in Fig. 2, so that when energized it produces a torque which opposes the torque of the meter and this opposing or counter-torque is designed to be equal to the meter torque when the rate of consumption of energy equals the predetermined rate. The current and potential coils of the meter produce a torque proportional to the rate of consumption of energy being metered, while the auxiliary coil produces a counter-torque corresponding to a predetermined rate of consumption. The counter-torque is not continuously present and therefore, a locking of the meter against backward rotation is not necessary. The meter of Fig. 2 is in operation only when the rate of consumption of energy is in excess of a predetermined rate, and the meter will directly register only the quantity of energy consumed in excess of a predetermined quantity.

While we have illustrated in the accompanying drawings registers of well known types for registering the quantities characteristic of our novel and improved meter, it will, of course, be understood that any suitable means may be employed to obtain the desired registrations. In the specification and appended claims we have used the term "register" in its generic sense with the intention of covering any of the well known forms of registrations.

In accordance with the provisions of the patent statutes, we have described the principle of operation of our invention, together with the apparatus which we now consider to represent the best embodiment thereof, but we desire to have it understood that the apparatus shown is only illustrative, and that the invention can be carried out by other means.

What we claim as new and desire to secure by Letters Patent of the United States, is:—

1. The combination with an electrical installation, of an electric meter for determining the amount of energy consumed in said installation in excess of a specified quantity during the times that the rate of consumption of energy exceeds a significant predetermined value comprising, a stationary field coil adapted to carry a current dependent upon the rate of consumption of energy in said installation, a second stationary field coil adapted to carry a substantially constant current, a rotatable element having an armature winding positioned within the influence of each of said field coils, said coils and armature winding being so related that the first mentioned coil tends to produce forward rotation of said element while the second mentioned coil tends to produce backward rotation of said element, and a device responsive to the flow of energy in said installation for electrically connecting said second mentioned field coil and said armature winding to said installation only when the rate of consumption of energy in said installation exceeds said significant predetermined value.

2. An electric meter for registering the amount of energy consumed in excess of a specified quantity during the times that the rate of consumption of energy exceeds a significant predetermined value comprising in combination, a rotatable element, a motive element coöperating with said rotatable element tending to produce a forward rotation of said rotatable element dependent upon the rate of consumption of energy being metered, a second motive element coöperating with said rotatable element tending to produce a uniform backward rotation of said rotatable element, and means responsive to the rate of consumption of energy being metered for maintaining said rotatable element at rest until the rate of consumption of energy exceeds said significant predetermined value.

3. The combination with an electrical installation, of an electric meter for determining the amount of energy consumed in said installation in excess of a specified quantity during the times that the rate of consumption of energy exceeds a significant predetermined value comprising, a rotatable element, means coöperating with said element tending to produce rotation of the element dependent upon the rate of consumption of energy in said installation, means set into operation only when the rate of consumption of energy exceeds said significant predetermined value tending to produce an action indicative of the length of time the rate of consumption of energy exceeds said significant predetermined value, and means responsive to the flow of energy in said installation operatively related to said last mentioned means and to a winding of the meter whereby said rotatable element is maintained at rest until the rate of energy consumption exceeds said significant predetermined value.

In witness whereof, we have hereunto set our hands this twenty-ninth day of October, 1912.

EVAN EVANS.
HEINRICH ZIEMENDORFF.

Witnesses:
HENRY HASPER,
WOLDEMAR HAUPT.